United States Patent
Needham et al.

(10) Patent No.: US 8,943,412 B2
(45) Date of Patent: Jan. 27, 2015

(54) GAME-BASED SELECTION SYSTEM

(71) Applicant: Intel Corporation, Santa Clara, CA (US)

(72) Inventors: Bradford H. Needham, North Plains, OR (US); Kevin C. Wells, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 13/674,173

(22) Filed: Nov. 12, 2012

(65) Prior Publication Data

US 2014/0136982 A1 May 15, 2014

(51) Int. Cl.
*G06F 3/00* (2006.01)
*H04L 29/08* (2006.01)

(52) U.S. Cl.
CPC .................................. *H04L 29/0809* (2013.01)
USPC .......................................................... 715/738

(58) Field of Classification Search
None
See application file for complete search history.

(56) References Cited

U.S. PATENT DOCUMENTS

| | | | | |
|---|---|---|---|---|
| 8,047,909 B2 * | 11/2011 | Walker et al. | ................... | 463/16 |
| 8,267,788 B2 * | 9/2012 | Kulas et al. | ..................... | 463/37 |
| 8,504,621 B2 * | 8/2013 | Ruff et al. | ..................... | 709/206 |
| 2003/0167265 A1 * | 9/2003 | Corynen | ........................... | 707/4 |
| 2004/0204235 A1 * | 10/2004 | Walker et al. | .................. | 463/29 |
| 2007/0054739 A1 * | 3/2007 | Amaitis et al. | .................. | 463/42 |
| 2007/0265083 A1 * | 11/2007 | Ikebata et al. | .................. | 463/37 |
| 2008/0222561 A1 * | 9/2008 | Helfman et al. | .............. | 715/810 |
| 2009/0112782 A1 * | 4/2009 | Cross et al. | ..................... | 706/45 |
| 2010/0106607 A1 * | 4/2010 | Riddiford et al. | ............... | 705/15 |
| 2011/0250965 A1 * | 10/2011 | Kulas et al. | ..................... | 463/36 |
| 2011/0269520 A1 * | 11/2011 | Amaitis et al. | .................. | 463/16 |
| 2013/0066750 A1 * | 3/2013 | Siddique et al. | ............. | 705/27.2 |
| 2013/0080578 A1 * | 3/2013 | Murad et al. | .................. | 709/217 |
| 2013/0084933 A1 * | 4/2013 | Amaitis et al. | .................. | 463/16 |
| 2013/0138450 A1 * | 5/2013 | Vigneux | ........................... | 705/2 |
| 2013/0326382 A1 * | 12/2013 | Nogami et al. | ............... | 715/765 |
| 2014/0019389 A1 * | 1/2014 | Abbas | ............................. | 706/12 |

\* cited by examiner

*Primary Examiner* — Matt Kim
*Assistant Examiner* — Maryam Ipakchi
(74) *Attorney, Agent, or Firm* — Trop, Pruner & Hu, P.C.

(57) ABSTRACT

In accordance with some embodiments, a system may enable the user to selectively either make computer generated selections without game play or to make menu selections in a more limited way in some embodiments in association with game play. Thus if the user selects game play, the user would be provided with at least two game options that implement menu selection tasks. For example the game play may allow the users to use a game to select within a group of menu options or to select a user who then gets the right to make a menu selection as another example.

24 Claims, 11 Drawing Sheets

OK, LET'S PLAY PICK ONE.

PLEASE PICK TWO OR MORE ENTRIES BELOW.

CATEGORY X

GAME-BASED SELECTION SYSTEM

BACKGROUND

This relates generally to using a computer to make selections or recommendations.

As used herein, a "selection" and a "recommendation" relate to two sides of the same activity. From the user's point of view, the user may need to make a selection between a number of options. From a computer's point of view, it offers a recommendation to the user for making a selection.

Decision support software may be used on computers in order to make decisions. Decision support software uses software designed to bring a group to consensus through rational selection among available options.

Processor based systems, commonly in the form of laptop computers, tablets or cellular telephone devices as well as mobile Internet devices, are becoming popular in a limited number of restaurants for facilitating menu selections. In some cases, restaurants may eventually dispense with waiters, allowing users to make selections from computer generated displays. Additional help and information is freely available in connection with those displays. Then the ordered items are brought out by a server.

There are many advantages to such systems including the fact that some users may find this system more consistent with the way they do other things in their lives and may find it enjoyable to order in this way. In addition there may be an advantage in speeding up the order taking process.

BRIEF DESCRIPTION OF THE DRAWINGS

Some embodiments are described with respect to the following figures:

FIG. 2 is a depiction of yet another graphical user interface to implement a selection within a category selected in connection with FIG. 1;

DETAILED DESCRIPTION

Figure 1:
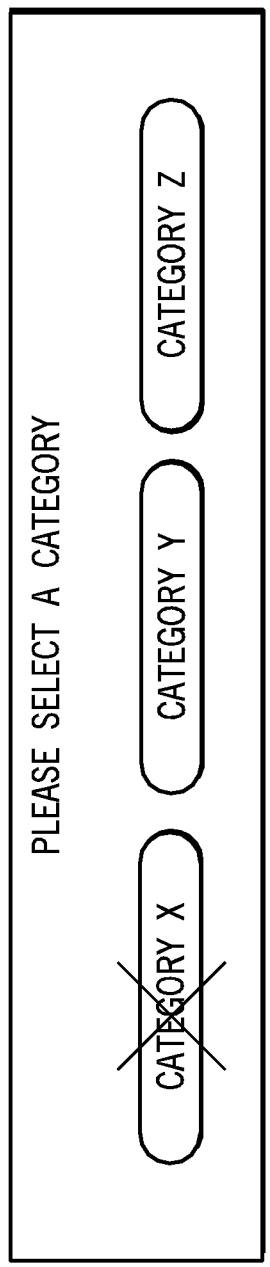
FIG. 1 is a depiction of a category selection graphical user interface in accordance with one embodiment to the present invention.

In some embodiments, a computer may support a decision making process. This selection may be assisted by the computer by providing graphical user interfaces or audible interfaces to enable the user to make a selection of a subset from within a set of available options. Then the user can select a particular option or options from the subset using a game-based selection system. The game-based selection system differs from rational selection in that it uses a game to make the selection. The game may operate under principles of chance or skill. But it generally would not involve any kind of rational decision making. Thus it tends to be fun rather than necessarily getting the correct result.

The computerized system may be implemented with any of a variety of computerized devices. They may have interfaces that are graphical, visual and/or audible. The possible computerized devices include not only mobile devices such as laptops, computers, tablets, mobile Internet devices and cellular telephones but conventional personal computers, built-in devices, wearable computers and kiosks.

While an example is given in the following description in a restaurant environment, those skilled in the art should appreciate that other applicable scenarios are numerous. As one example, a set of friends may choose which movie to watch at home. Each friend may use his or her cellular telephone to run a multi-user movie selection application. Each user picks a movie the user would like to see. Then, the choices are narrowed down to a subset of the possible movies. Finally, the users select one option by playing a computer operated game. The result of the game becomes the group selection.

Another application includes a group of people watching a movie together at a movie theater. There can be many movies playing at the theater and the selection process could proceed as described above in connection with a non-theater based selection.

Still another option would be a group at an amusement park choosing which ride to go on. Again, a multi-user application may show the users detailed information about the rides and allow them to express their own interest. Then a game may be offered to choose from among the selections the users are interested in.

Another option is choosing a travel activity. A multi-user application could show detailed information about points of interest in a given area and allow the users to express their own interest in what they would like to see or do. Then a game may automatically implemented by the computer to make the final selection from among the subset of options chosen by the users.

In yet another example, other choices not directly related to entertainment may be implemented. For example a group of people may wish to buy a product for the group. A computerized application could show them options that they are interested in and allow them to pick from among those options. Then the options defined in that subset may be narrowed down using a game to choose one of the selections.

Thus embodiments of the present invention are applicable to any selection process. Characteristics of some embodiments include a two-stage selection process wherein the users express preferences in the first stage to narrow down the available options to a subset. Then a game is used to make the final choice from among the options available in the subset. Both stages may be computer implemented in some embodiments. The computer implementation may be in the form of graphical user interfaces, audible interfaces, or mixtures of audible and graphical user interfaces. The feedback from the users may include audible, gesture-based inputs or may use typical input devices such as touch screens, keyboards, or mice, to mention a few examples.

In accordance with some embodiments, a system may enable the user to selectively either make computer generated menu selections without game play or to make menu selections in a more limited way, in association with game play. Thus if the user selects game play, the user would be provided with at least two game options that implement menu selection tasks. For example the game play may allow the users to use a game to select within a group of menu options or to select a user who then gets the right to make a menu selection as another example.

In some embodiments the selection tool may be a computer processor operated device. Suitable devices may include cellular telephones, mobile Internet devices, tablet computers, laptop computers, desktop computers as well as virtually any other type of processor-based device. In some cases, a display screen may allow the users to make selections of menu items using conventional selection devices such as mouse selection, keyboard selection and in some cases more advantageously touch screen selection. In many cases, the computer generated device may be made available for each of a plurality of users. The various devices may be networked over a wireless or wired network.

In some embodiments, the networked devices may also access the Internet. For example additional information may be gained about particular types of items by doing Internet-related searches. In addition, the user may have full access to computer capabilities while the user waits for the menu selections to arrive.

In some embodiments, the computer apparatus may be specially adapted for menu ordering. This may mean it may be provided in a format or a case that makes it visible to a variety of users or it may be even built into the dining table as another example. In other cases, conventional networked devices that are general purpose devices may be used.

Initially, a user may be prompted, via a graphical user interface, to make one or more selections from within a group of possible selections. For example, in the course of doing a menu selection process, the user may be asked to select among a plurality of options indicated as categories x, y, and z in FIG. 1. In the menu application, the selections could be to choose between appetizers, desserts and main courses. In the movie use case the selections could be between drama, comedy and action. In a travel scenario it could be between United States, Canada and Europe.

Then the user can be asked, via a graphical user interface, to make selections from within the selected category, in the illustrated case, category x, as shown in FIG. 2. The user would be given a plurality of options to select and could select one or more items within category x. Thus, in the case of appetizers, the users could select a set of three appetizers so that they can further narrow down their selections from among those three appetizers.

A user can opt to select one of a plurality of games to aid in making further more refined selections. In one example, the Pick One game allows the resolution of real or play disputes about what item should or should not be ordered, especially in the case where menu items might be shared across the table. The game resolves such a dispute or simply provides a fun way to resolve the dispute. A Pick One game may be implemented in which the computer, guided by the user, makes random selections between available menu choices. In some embodiments the groups of choices that are used as a basis for random selection are pre-selected by the users and then the computer makes a selection using random selection tools from among those selections. In other cases, other criteria may be used for selection including play of a game of skill, play of a game of chance, or the like.

The other game, called Dibs, may be an example of a game that basically selects a user who then makes a choice. Again, the selection may be done by random, by chance, or by using a skilled game to decide a winner who gets to make the choice.

There may be at least two different games that may be implemented by some systems in accordance with embodiments of the present invention, including games that select among users who can make choices and games that select among a limited range of menu choices. The games such as Pick One allow resolution of real or imaginary disputes and games such as Dibs may resolve disputes about who gets to make a choice of a particular item which is of limited availability for one reason or another.

Figure 3:
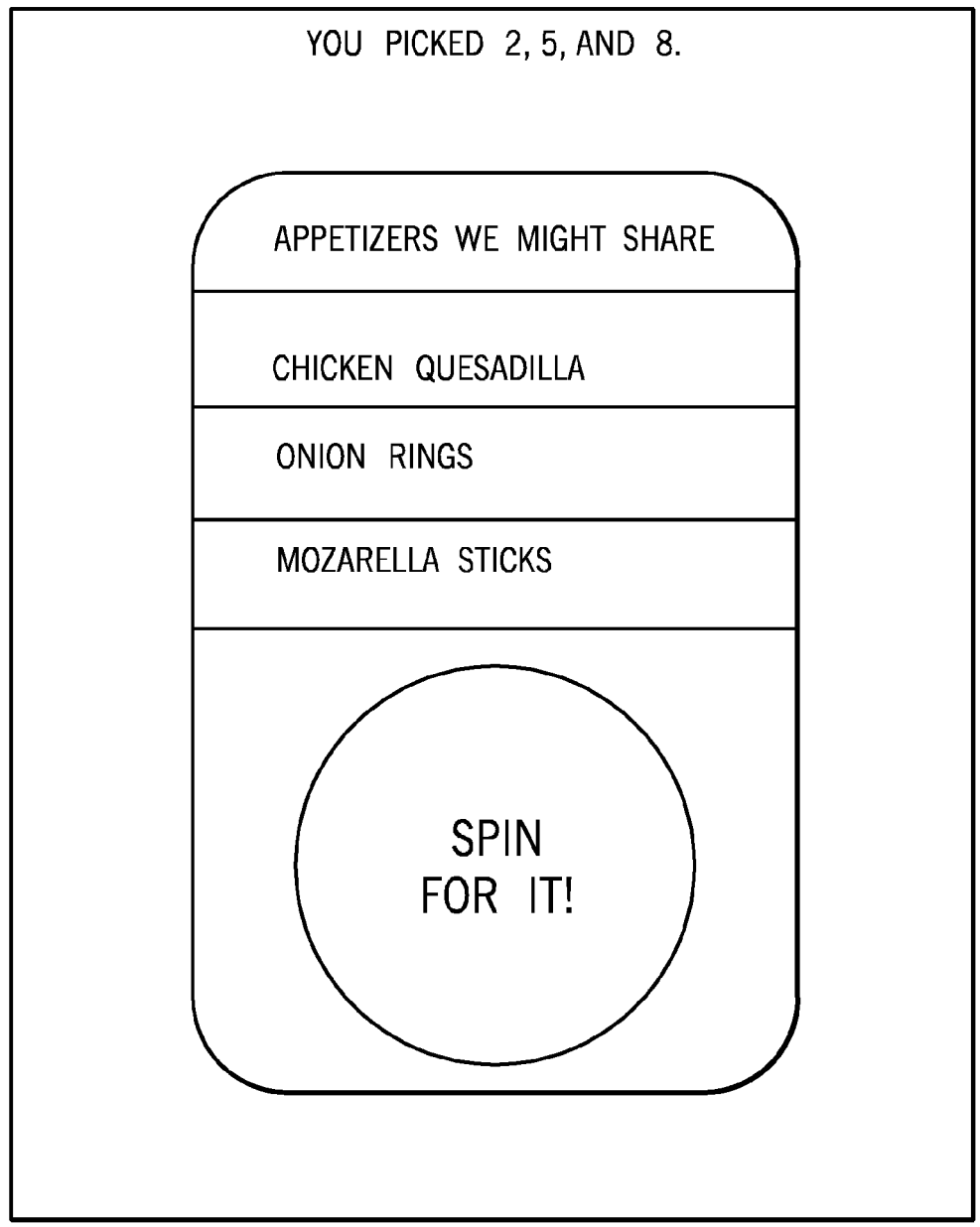
FIG. 3 is another graphical user interface for implementing the selected game according to one embodiment.

FIG. 3 shows an example of a graphical user interface for the type of game where the selection is between a group of items in a previously selected category, for example the Pick One game. The graphical user interface prompts the user to pick two or more entries from a list. Thus, in this case, a list of appetizers is provided and either or both users may make selections from that list.

In some embodiments two separate display screens may be used and each screen may be touch selectable. Each user can make selections that are recognized in accordance with some embodiments.

Figure 4:
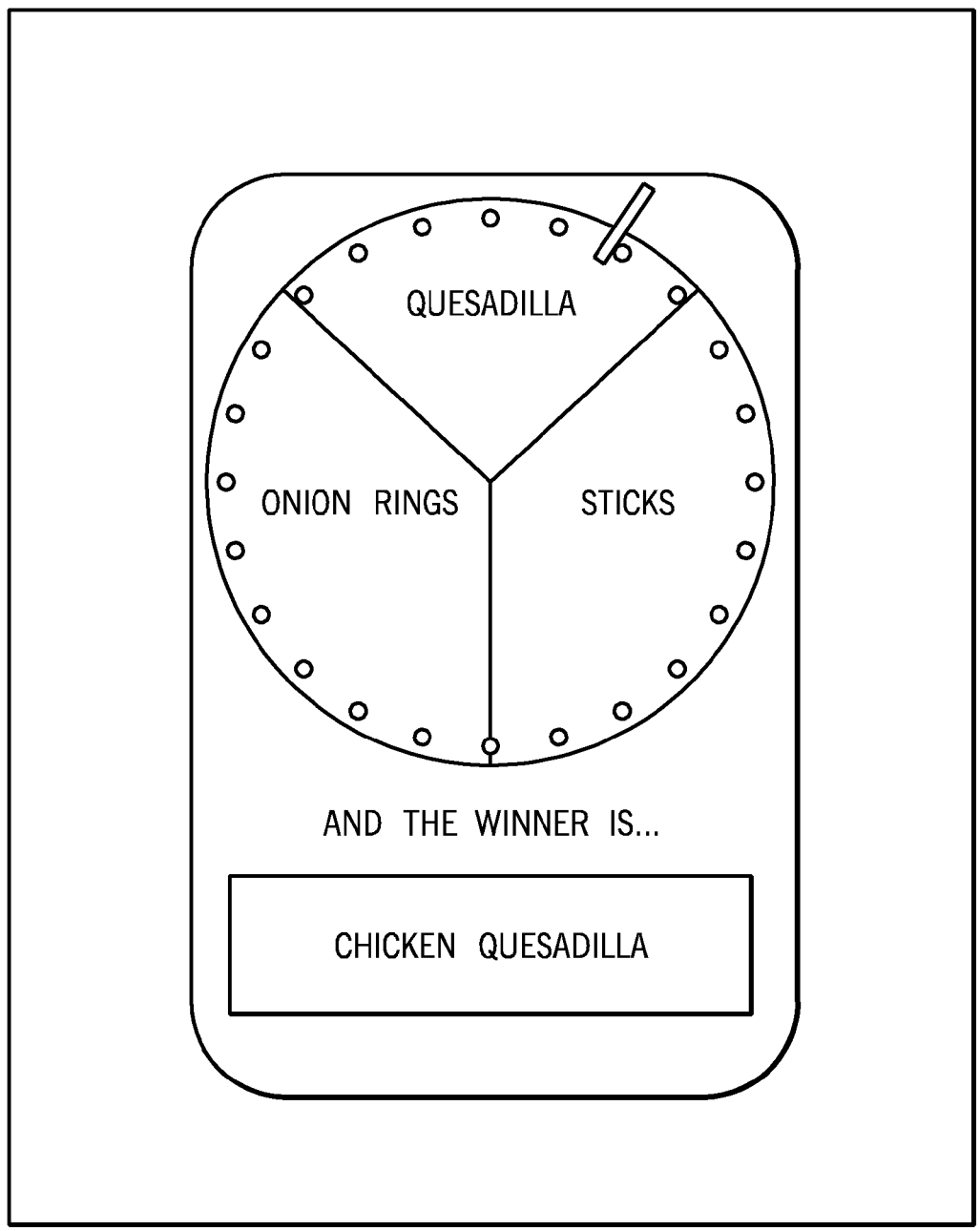
FIG. 4 is another graphical user interface for implementing the same game in accordance with one embodiment.

The system indicates which choices have been selected, in some embodiments, within an allowed time period. In this case the system graphical user interface indicates that items 2, 5 and 8 were picked. A graphical user display provides a game interface as well as indicating a preliminary selection. In this case, it is a typical spin game that allows the users to select from among the three enumerated options. The user simply touches, taps, or swipes the screen over the heading or icon, "Spin for It," in order to cause an arrow to spin in connection with the graphical user interface shown in FIG. 3. The contact speed or intensity may be used to control the initial spin speed. The contact speed can be measured from a graphical user interface prompt to a time when contact on a touch screen is detected. Wherever the arrow stops, as indicated by the hash mark in FIG. 4, is the computer generated random selection. In this case, the icon stopped on the pie chart item for quesadilla, indicating the selection of a quesadilla.

Figure 5:
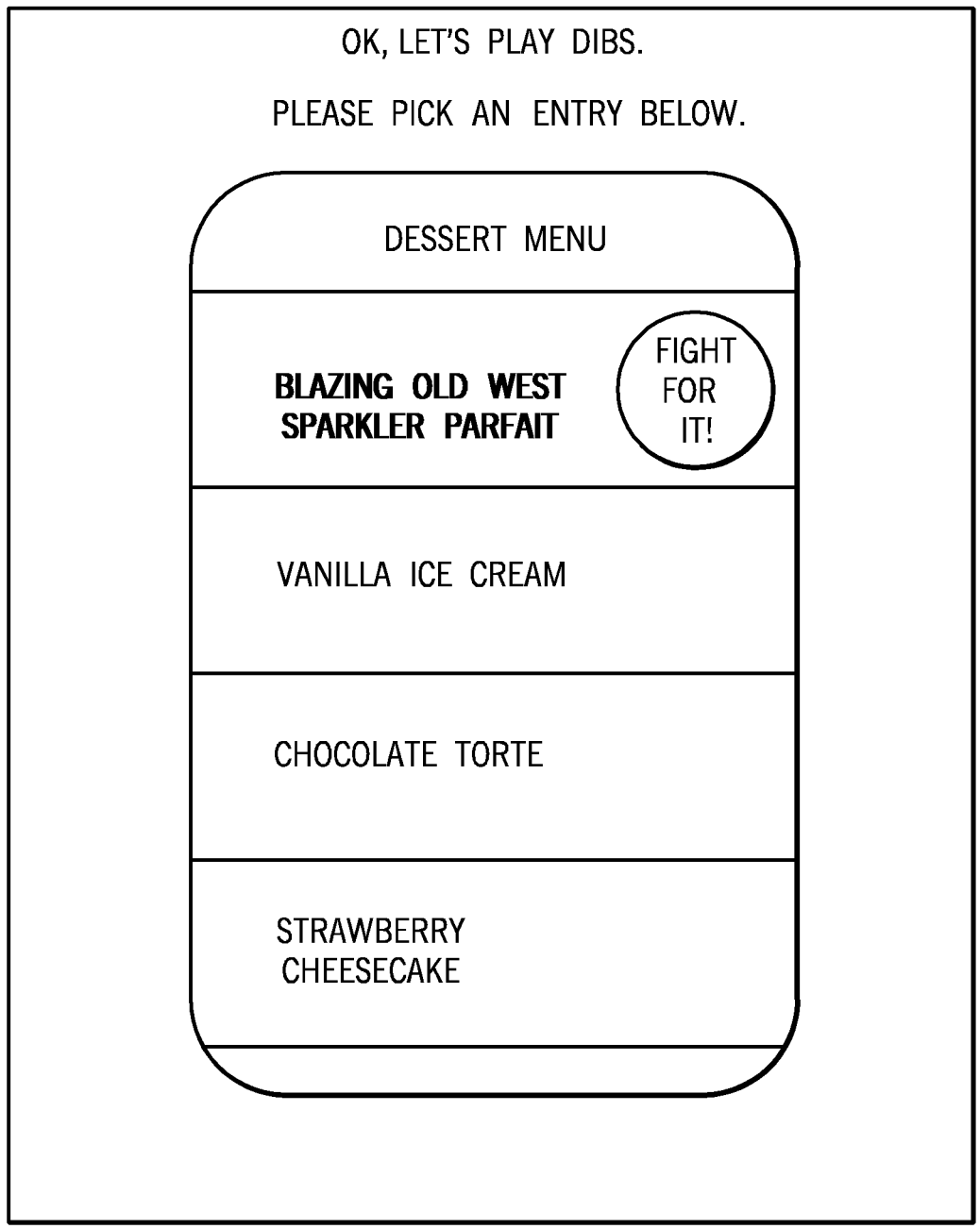
FIG. 5 is a graphical user interface for use with the other alternative game in accordance with one embodiment.

FIG. 5 provides a graphical user interface in connection with a game to select a user rather than a menu option. Again however, the selected user is associated with a particular menu option. As an example, suppose there is only one quesadilla left, the game Dibs allows one of the users to claim the last remaining quesadilla.

In this case, the graphical user interface shown in FIG. 5 prompts the user to pick an entry from a menu below. The entries in this example are the dessert menu as shown in FIG. 5.

Figure 6:
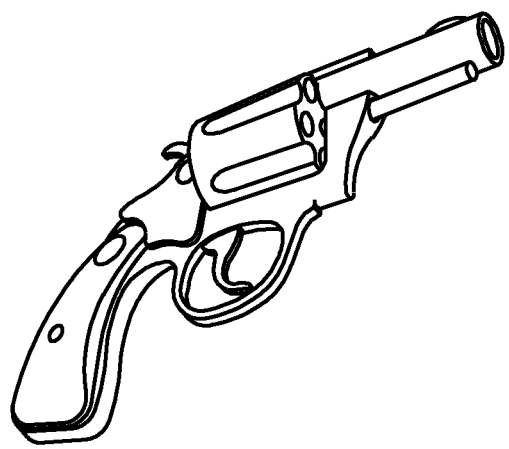
FIG. 6 is a graphical user interface in connection with the another game in accordance with one embodiment.

An icon is displayed in FIG. 6 that says, at the count of ten, "draw your guns." An audible count down from one to ten may play and the user who "draws" the computer generated icon first, is the winner. As a result that user gets to choose which of the three dessert menu options will be either the shared option or the user gets to pick the only remaining option that is available. The first user can be detected using an on-board accelerometer in the computer. Particularly, the accelerometer typically included in a cellular telephone may be used to determine how fast a cellular telephone is rotated from along the side of the user's thigh to a position pointing at another user. This motion simulates drawing a pistol.

Figure 7:
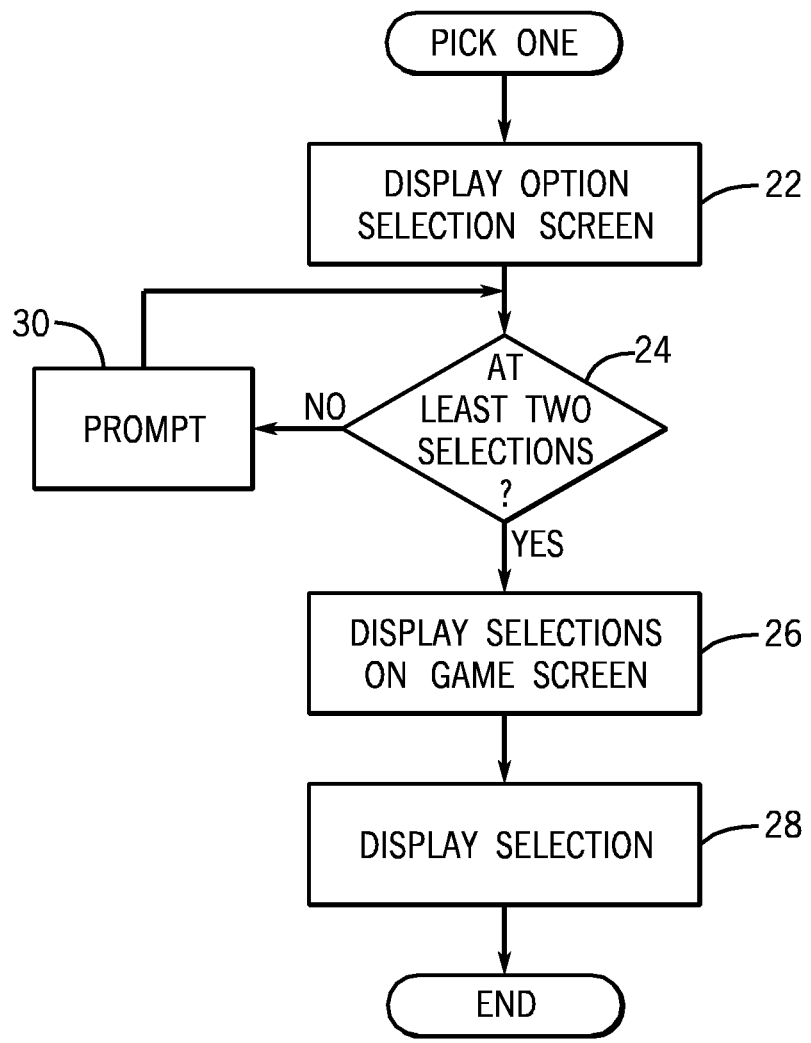
FIG. 7 is a flow chart for a user to select between conventional computer generated menu selection and game playing associated with menu selection in accordance with one embodiment of the present invention.

Thus referring to FIG. 7, in some embodiments, a sequence may be implemented in software, firmware and/or hardware. In software and firmware embodiments it may be implemented by computer executed instructions stored in one or more computer readable media such as a non-transitory computer readable medium including a semiconductor, optical or magnetic storage device.

The implementation of the Pick One game, shown in FIG. 7, begins by displaying an option selection screen as indicated in block 22. In one embodiment, this corresponds to FIG. 2.

Next the check at diamond 24 determines whether the user has made at least one selection as indicated in association with FIG. 3. If not, because a time-out occurs, a prompt screen may be displayed as indicated in block 30 encouraging the users to continue with the game.

On the other hand if the user has made a selection, the selections are displayed in association with the game screen as indicated in block 26. One useful graphical user interface for indicating the game selections is shown in FIG. 4. The selections are then displayed as indicated in block 28. For example, the computer selected option may be displayed.

Figure 8:
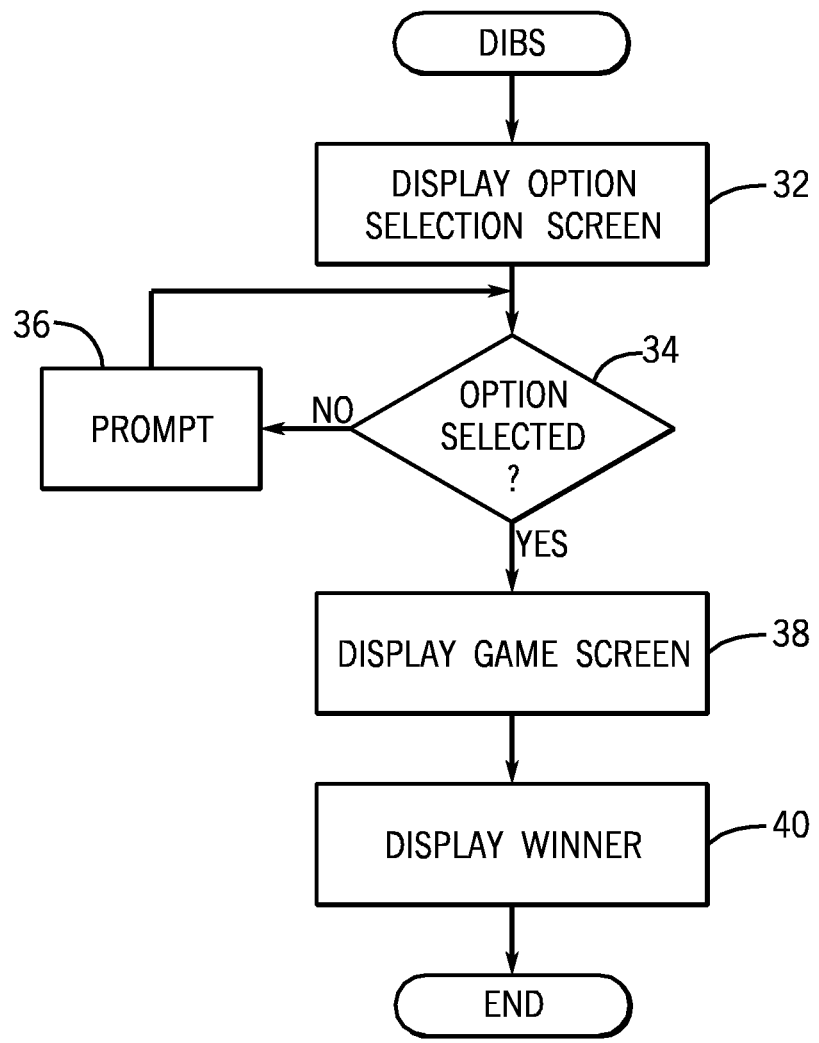
FIG. 8 is a flow chart for implementing optional game play in accordance with some embodiments of the present invention.

On the other hand, if the user selects the Dibs game in this embodiment, the flow is shown in association with FIG. 8 according to one embodiment. Thus referring to FIG. 8, in some embodiments, a sequence may be implemented in software, firmware and/or hardware. In software and firmware embodiments it may be implemented by computer executed instructions stored in one or more computer readable media such as a non-transitory computer readable medium including a semiconductor, optical or magnetic storage device.

Initially an option selection screen is displayed as indicated in block 32. One suitable selection screen may be that shown in FIG. 5. Again if an option is not selected in time, as indicated at diamond 34 and block 36, a prompt may be provided. If a selection is received, then the game screen is displayed as indicated in block 38. One example of the game screen is shown in FIG. 6. Then the winner is displayed in accordance with the rules of the game as indicated in block 40. In some embodiments, the game selects a participant to pay the bill.

Figure 9:
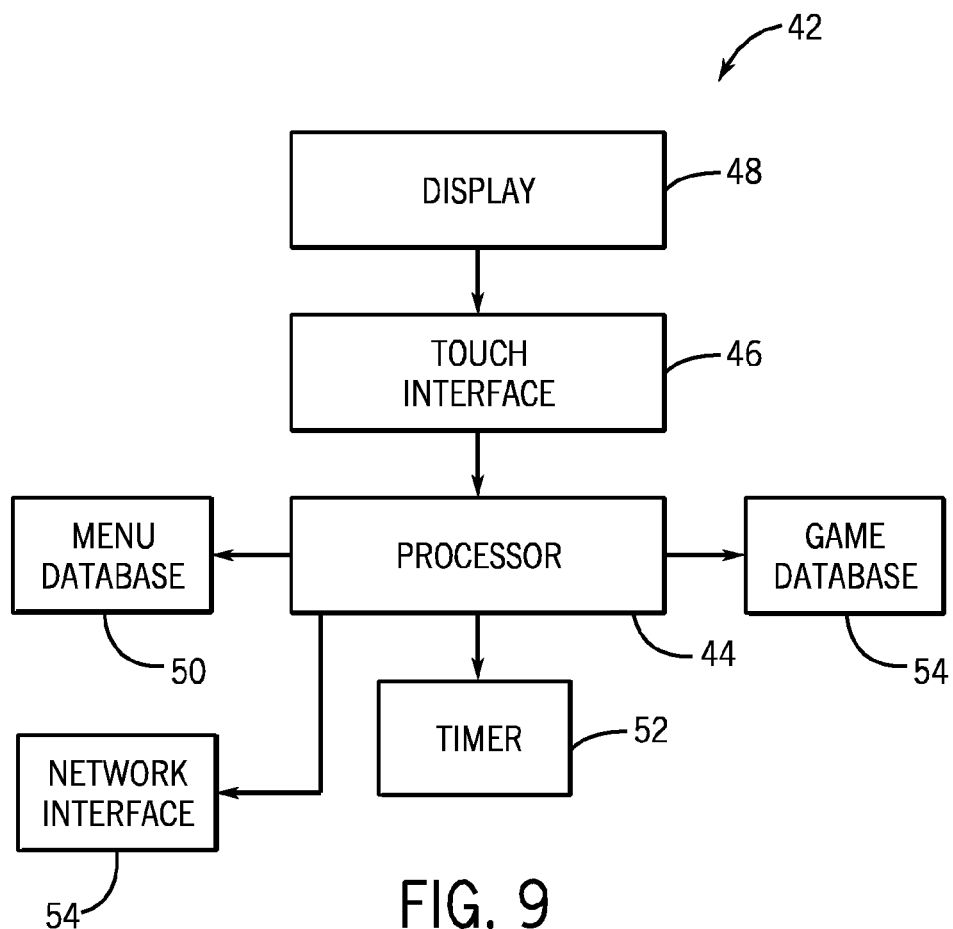
FIG. 9 is a hardware depiction for one embodiment of the present invention.

Again a wide variety of computer generated devices may be utilized including a mobile device of the type shown in FIG. 9 at 42. The device 42 may include a processor 44 coupled to a menu database 50 including information about menu selections and a game database 54 providing information about possible games and how to implement them. A timer 52 may be coupled to the processor at the time the user responses. A touch interface 46 may be coupled to the processor in some embodiments together with the display 48. A network interface 54 allows a device 42 to communicate over a network with a remote server.

In one embodiment a network may be established between customer devices and a server. The customer devices may be dedicated devices provided by the establishment such as a restaurant or may be the customer's own devices that join the network via an application in one embodiment.

The server may be a server run by the establishment in one embodiment. In other embodiments, the server may be remote, for example, as part of a cloud. In still another embodiment, the server may be operated by a service provider that provides a service for many establishments. For example, the service provider may provide the menu options and games to the customers, adapted to the specific offering of a particular establishment.

The link to the server may be hardwired, or wireless, using a cellular or Wi Fi connection in one embodiment. The server may then electronically forward customer selections such as menu selections electronically to the establishment.

Figure 10:
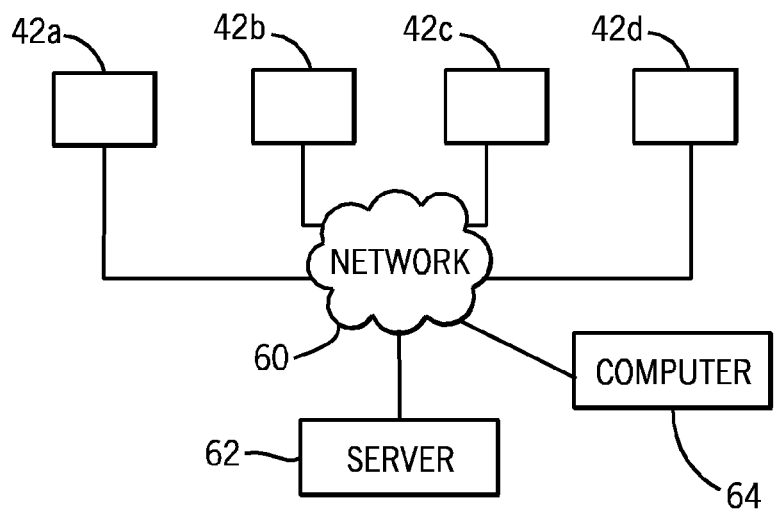
FIG. 10 is a hardware depiction for another embodiment.

Thus, as shown in FIG. 10, a plurality of customer devices 42a, 42b 42c, and 42d are networked, via network 60, with a server 62. The devices 42 can communicate with each other and the server 62 over the network 60. In embodiments where the server is separate from the establishment, all devices may also communicate with a computer 64 on the network, wherein the computer is associated with the establishment.

In some embodiments user options such as menu options and game options may be served to devices 42 by server 62. Similarly user selections, entered on devices 42, may be communicated for processing on the server 62. In some cases those selections may be electronically transferred to a computer 64 for order fulfillment for example.

Figure 11:
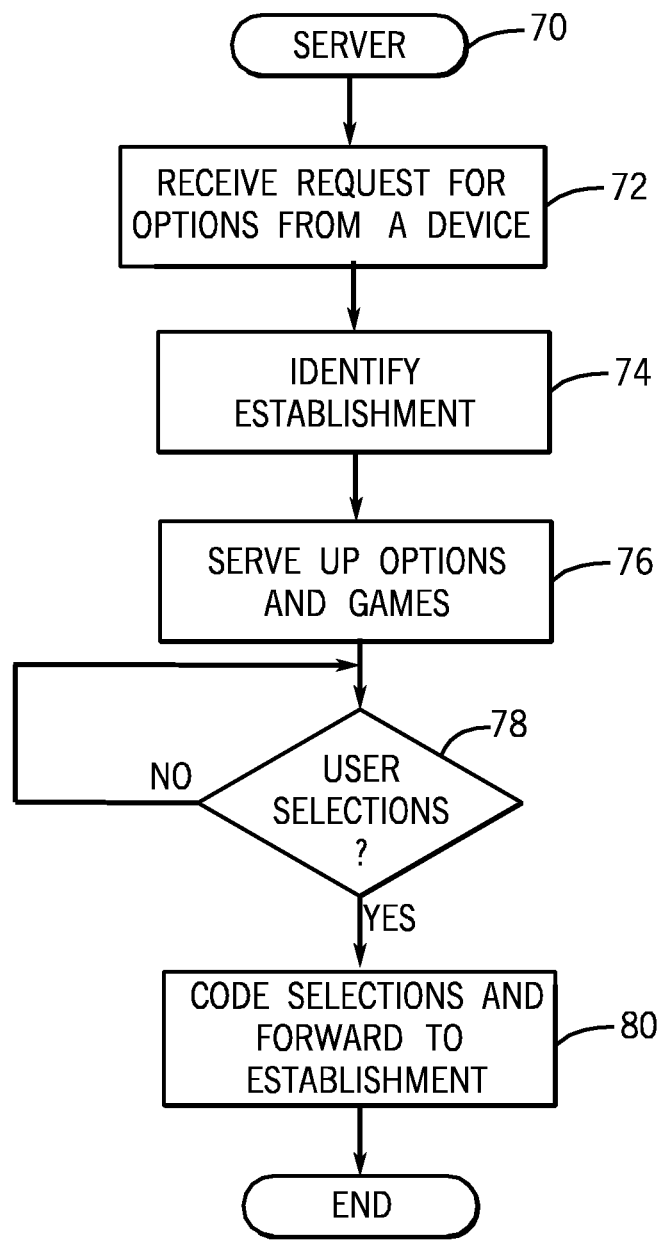
FIG. 11 is a flow chart for a server according to one embodiment.
Figure 12:
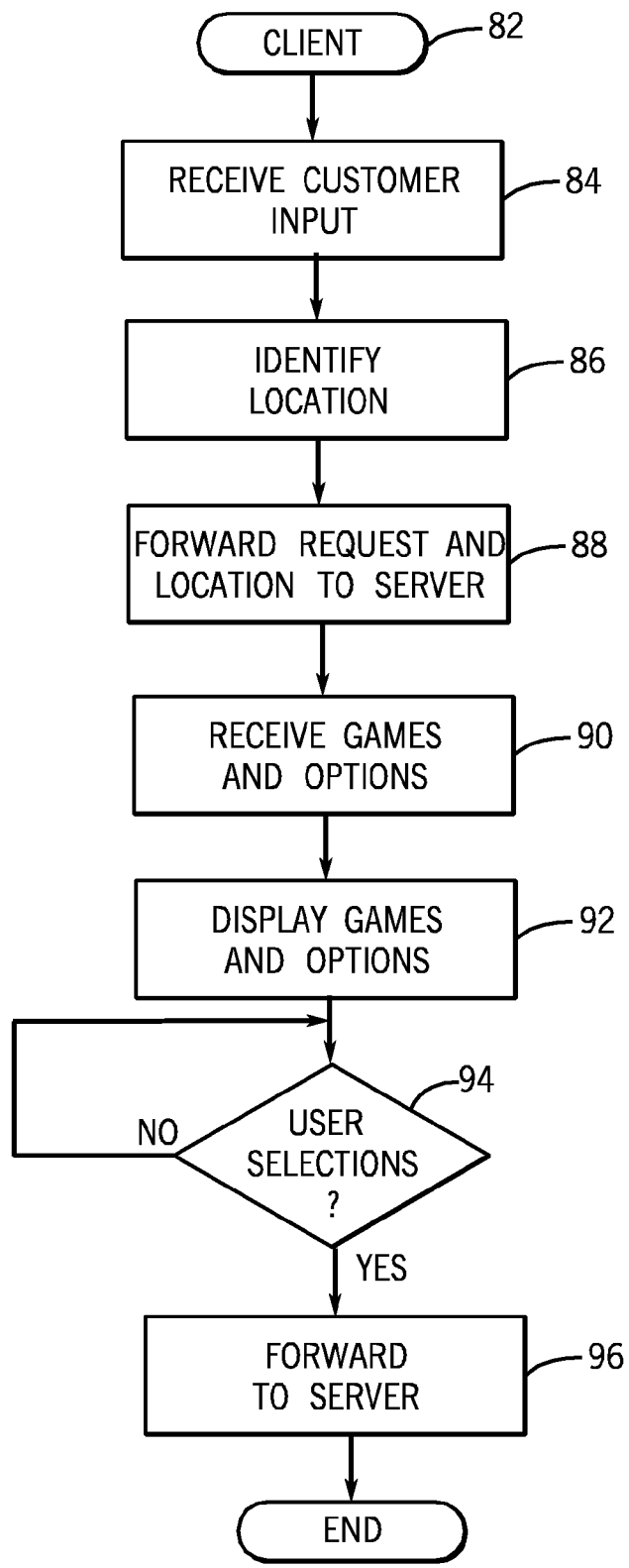
FIG. 12 is a flow chart for a client according to one embodiment.

FIGS. 11 and 12 are flow charts implemented by a server and a client according to some embodiments of the present invention. The server in some embodiments may be a remote server and the client in some embodiments may be a local device either provided by an establishment or by the user. Thus, a client device may be a device 42 that the client uses for other purposes and it has an application that allows it to work in the present situation. The sequences shown in FIGS. 11 and 12 may be implemented in software, firmware and/or hardware. In software and firmware embodiments, they may be implemented by computer executed instructions stored in one or more non-transitory computer readable media such as magnetic, optical or semiconductor storages. For example, the client sequence may be implemented on a device 42 and the server sequence 70 may be implemented on a server 62.

Initially, the menu serving sequence 70 shown in FIG. 11 receives a request for a menu from a local device as indicated at block 72. Information in the request may be used to identify a particular establishment as indicated in block 74. Then knowing the name of the establishment, the appropriate menu and games for that establishment may be served up as indicated in block 76 for display on a device 42. When menu selections in the course of games or from the menus are received as indicated in block 78, the selections may be coded in some embodiments and forwarded for fulfillment to the establishment as indicated in block 80. The menu selections may be coded by the device 42 and forwarded over a network to the server 62.

For example, as shown in FIG. 12, the menu client 82, which may be resident within a device 42, receives a consumer input as indicated at block 84. Then the device identifies a location that the request is received from. This may be done in many ways including asking the user to enter the name of the restaurant. Alternatively, position sensing capabilities such as global positioning system capabilities on the device 42 may be used to identify the location of a restaurant or other retail establishment as indicated in block 86. Then the request for the menu and games may be forwarded, together with the location information, to a server as indicated in block 88. This may be done by providing a network request to the remote server over a network in some embodiments.

Next the games and menus may be received as indicated in block 90 at the local device 42 from the remote server in some embodiments. The games and the menus may be displayed as indicated in block 92. Next user selections may be received locally as indicated in block 94 and these selections in some embodiments may be forwarded to the server for implementation as indicated in block 96.

Thus in some embodiments, a variety of different restaurants may have their electronic menu capabilities and game implementations handled remotely so that it is not necessary for each establishment to develop the games and to implement the electronic menu selections. This may also dispense with the need for waiters and waitresses with regard to order taking in some embodiments.

A variety of games may be used in different embodiments of the present invention. This may include chance forms of selection including "spinning" a wheel, "flipping" a coin, "rolling" dice, "drawing" a card, "pulling" a slot machine arm and "spinning" a phone (the same as spinning the bottle except one spins the user's own cellular phone and uses the acceleration sensors to determine where it stops).

Other chance forms of selection among people include high card wins, odd/evens where each player chooses an icon of a hand with a number of fingers and odd sum causes one player to win, while the even sum causes the other player to win. Other examples include rock, paper scissors, drawing straws or drawing lots.

Skill games for selecting among people include: quick draw where you draw your gun gesture with your phone, slap phone—first person who touches the screen wins, spell casting—where you wave a wand gesture with your phone and shove ha'penny which is an adaptation of a pub coin game in which you shove your phone forward in a shuffleboard-like game to move a coin on the screen. Still other examples include trivia games where the high scorer wins or the first answer wins.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing, via a server, a computerized user interface to enable a plurality of users to collectively make a decision, the method comprising:
   enabling the plurality of users to select a subset of options from a set of options, the set of options pertaining to a selection of one of a menu item, an entertainment item, and a travel item, and after the selection by the users only the selected subset of options remaining for further selection by the plurality of users;
   starting a computer game for the plurality of users to play to further select an option within said subset, the computer game including detecting a pattern of motion of a plurality of cellular telephones of each of the users, the motion of each of the cellular telephones corresponding to drawing a gun after a predetermined start time, and determining which of the patterns of motion corresponding to drawing a gun was completed first after the start time and determining which of the plurality of users the cellular telephone that completed pattern of motion first belongs to; and
   enabling only the cellular phone determined to be associated with pattern that was completed first to make a final selection from the subset of options as the decision via the user interface, and enabling the user interface to communicate the decision to said server.

2. The method of claim 1 including enabling the user to computer select a movie item as the entertainment item.

3. The method of claim 1 including implementing computerized selection based on chance.

4. The method of claim 1 including implementing computerized selection based on skill.

5. The method of claim 1 including displaying a graphical user interface of a spinning arrow.

6. The method of claim 5 including translating a characteristic of user interaction with said arrow into a speed of arrow rotation.

7. The method of claim 1 including using a measure of cellular telephone acceleration to make a menu selection.

8. The method of claim 7 including using an accelerometer to measure the speed of cellular telephone movement.

9. The method of claim 1 including implementing computerized selection of a person to pay for a meal.

10. One or more non-transitory computer readable media storing instructions to enable a processor to:
    produce a computerized user interface to enable a plurality of users to collectively make a decision, via the user interface, the processor enabling the plurality of users:
    to select a subset of options from a set of options, via the user interface, the set of options pertaining to a selection of one of a menu item, an entertainment item, and a travel item, and after the selection by the users only the selected subset of options remaining for further selection by the plurality of users via the user interface;
    to execute a computer game via the user interface for the plurality of users to play to further select an option within said subset, the computer game including detecting a pattern of motion of a plurality of cellular telephones corresponding to drawing a gun after a predetermined start time, and determining which of the cellular telephones completed the pattern of motion first after the start time; and
    to enable only the cellular phone determined to be associated with the pattern that was completed first to be used to make, via the user interface, a final selection from the subset of options as the decision, and enabling the user interface to communicate with a server to receive the decision.

11. The media of claim 10 further storing instructions to enable the user to select a person to make a menu selection.

12. The media of claim 10 further storing instructions to make a selection based on chance.

13. The media of claim 10 further storing instructions to make a selection based on skill.

14. The media of claim 10 further storing instructions to produce a graphical user interface of a spinning arrow.

15. The media of claim 14 further storing instructions to translate a characteristic of user interaction with said arrow into a speed of arrow rotation.

16. The media of claim 10 further storing instructions to measure cellular telephone acceleration and to use that acceleration to make a menu selection.

17. The media of claim 16 further storing instructions to measure the speed of cellular telephone movement.

18. The media of claim 10 further storing instructions to select a person to pay for a meal.

19. An apparatus comprising:
    a processor to generate a computerized user interface to enable a plurality of users to collectively make a decision, via the user interface, the processor enabling the plurality of users:
    to select a subset of options from a set of options, via the user interface, the set of options pertaining to a selection of one of a menu item, an entertainment item, and a travel item, and after the selection by the users only the selected subset of options remaining for further selection by the plurality of users via the user interface; and to execute a computer game via the user interface for the plurality of users to play to further select an option within said subset, the computer game including detecting a pattern of motion of a plurality of cellular telephones of each of the users, the motion of each of the cellular telephones corresponding to drawing a gun after a predetermined start time, and determining which of the cellular telephones completed the pattern of motion first after the start time;

a memory coupled to said processor; and a network interface enabling only the cellular phone determined to be associated with the pattern that was completed first to be used to make, via the user interface, a final selection from the subset of options as the decision, and enabling the user interface to communicate with a server to receive the decision.

20. The apparatus of claim 19, said processor to enable the user to select a person to make a menu selection.

21. The apparatus of claim 19, said processor to make a selection based on chance.

22. The apparatus of claim 19, said processor to make a selection based on skill.

23. The apparatus of claim 19 wherein said apparatus is a cellular telephone, said processor to measure acceleration and to use that acceleration to make a menu selection.

24. The apparatus of claim 23, said processor to measure a speed of cellular telephone movement.

* * * * *